United States Patent
Sossenheimer et al.

(10) Patent No.: US 9,664,557 B2
(45) Date of Patent: May 30, 2017

(54) METHOD AND SEMICONDUCTOR COMPONENT FOR IDENTIFYING AMBIENT LIGHT FLUCTUATIONS

(71) Applicant: OSRAM OPTO SEMICONDUCTORS GMBH, Regensburg (DE)

(72) Inventors: Dirk Sossenheimer, Regensburg (DE); Hubert Halbritter, Dietfurt (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 0 days.

(21) Appl. No.: 14/415,513

(22) PCT Filed: Jul. 12, 2013

(86) PCT No.: PCT/EP2013/064828
§ 371 (c)(1),
(2) Date: Jan. 16, 2015

(87) PCT Pub. No.: WO2014/012862
PCT Pub. Date: Jan. 23, 2014

(65) Prior Publication Data
US 2015/0211920 A1 Jul. 30, 2015

(30) Foreign Application Priority Data

Jul. 20, 2012 (DE) .......................... 10 2012 106 628

(51) Int. Cl.
*G01J 1/42* (2006.01)
*G01J 1/16* (2006.01)
(Continued)

(52) U.S. Cl.
CPC ........... *G01J 1/4204* (2013.01); *G01J 1/0233* (2013.01); *G01J 1/16* (2013.01); *G01J 1/4257* (2013.01);
(Continued)

(58) Field of Classification Search
CPC .... G01J 1/44; G01J 1/0233; G01J 2001/4247; G01J 2001/0257; H01S 2301/18; H01S 3/10; H05B 37/0218
(Continued)

(56) References Cited

U.S. PATENT DOCUMENTS 5,789,723 A * 8/1998 Hirst ...................... G03G 15/80
219/216
7,817,920 B2 * 10/2010 Lee .................... H04B 10/1143
398/120
(Continued)

FOREIGN PATENT DOCUMENTS

AT 503817 1/2008
DE 69106488 8/1995
(Continued)

OTHER PUBLICATIONS

B. Lehman et al.: "Proposing measures of flicker in the low frequencies for lighting applications," Leucos—the Journal of the Illuminating Engineering Society of North America, vol. 7, No. 3, Jan. 3, 2011, pp. 189-195.
(Continued)

*Primary Examiner* — Hoa Pham
(74) *Attorney, Agent, or Firm* — Cozen O'Connor

(57) ABSTRACT

Fluctuation frequency (F) of an ambient light (S) is identified by: A) specifying first frequency (F1) and second frequency (F2), higher than said first frequency; B) measuring an optical power of the ambient light with a signal receiver (2) over a measuring time interval (Ti) during a total measuring time (T), which is shorter than or equal to a first cycle duration (P1) belonging to the first frequency; C) detecting the optical power of the ambient light in a time series over the total measuring time; D) determining at least one detection feature for identifying the fluctuation frequency by evaluating the time series; and E) identifying the
(Continued)

fluctuation frequency of the ambient light as the first frequency or as the second frequency using the at least one detection feature.

14 Claims, 5 Drawing Sheets

(51) Int. Cl.
　　*H05B 37/02* (2006.01)
　　*G01J 1/02* (2006.01)
　　*G01J 1/44* (2006.01)
(52) U.S. Cl.
　　CPC ............ *G01J 1/44* (2013.01); *H05B 37/0218* (2013.01); *G01J 2001/0257* (2013.01); *G01J 2001/4247* (2013.01); *Y02B 20/46* (2013.01)
(58) Field of Classification Search
　　USPC .................................................. 356/213–235
　　See application file for complete search history.

(56) References Cited

U.S. PATENT DOCUMENTS

| 8,045,017 B2 | 10/2011 | Shan | |
|---|---|---|---|
| 2008/0095533 A1* | 4/2008 | Lee | ...................... H04B 10/116 |
| | | | 398/38 |

FOREIGN PATENT DOCUMENTS

| DE | 69412736 | 4/1999 |
|---|---|---|
| DE | 102007045259 | 4/2009 |
| DE | 10 2010 003 055 | 9/2011 |

OTHER PUBLICATIONS

C. Rong et al.: Flickermeter used for different types of lamps 9th International Conference on Electrical Power Quality and Utilisation, IEEE, Piscataway, NJ, Oct. 9, 2007, pp. 1-8.

* cited by examiner

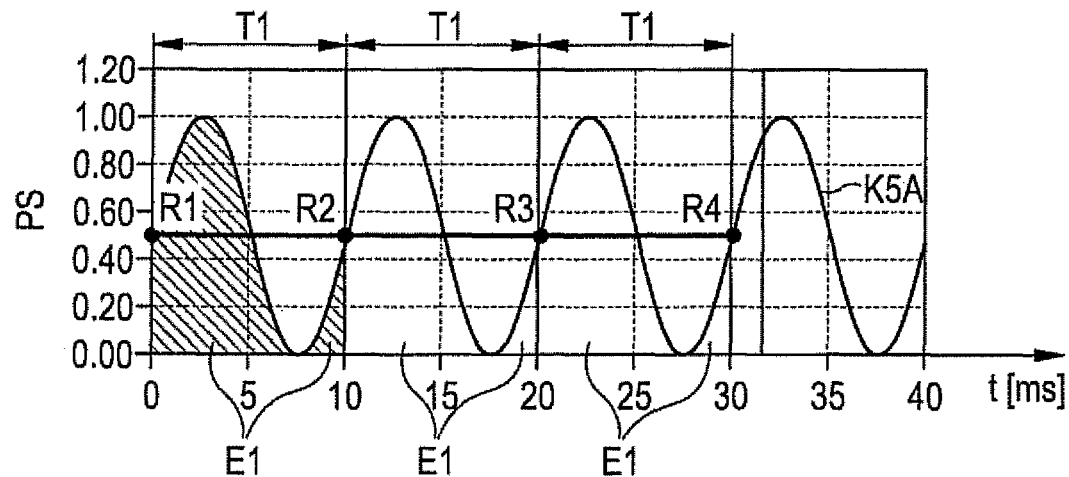
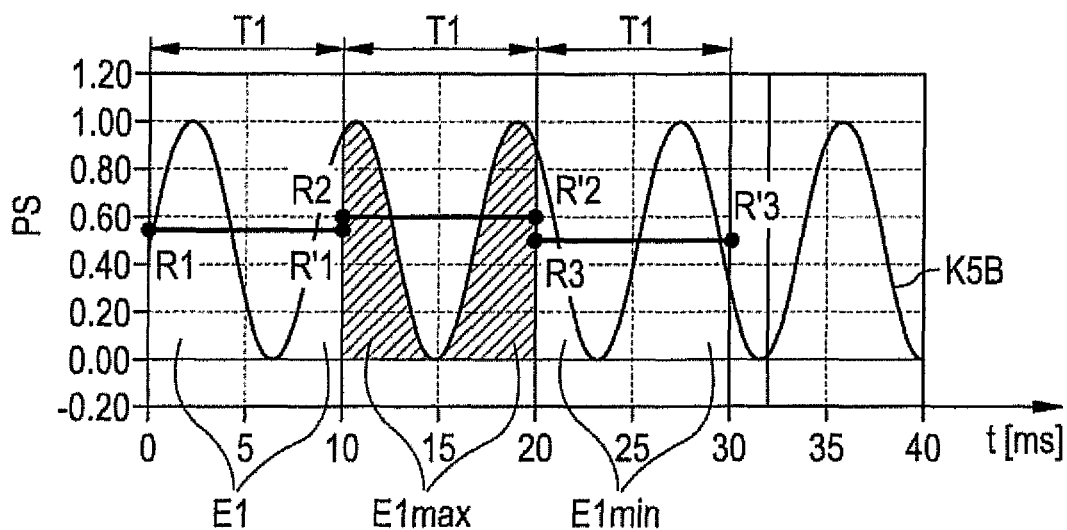

|  | (E1max-E1min)/(E2max-E2min) | |
| --- | --- | --- |
|  | 50 Hz | 60 Hz |
| OSRAM DULUX Electronic 20 W | 0,1925 | 2,5236 |
| SHINE SFC-222/6 22 W | 0,1075 | 5,9189 |
| OSRAM DELUX EL longlife 30 W | 0,0701 | 16,5263 |
| MINI Rose Ball 15 W | 0,4043 | 2,7661 |
| OSRAM Krypton q4b8 100 W | 0,0355 | 27,3265 |
| EF 3U 18 W | 0,1933 | 3,2105 |
| OSRAM L20W/25S | 0,0961 | 11,0755 |

METHOD AND SEMICONDUCTOR COMPONENT FOR IDENTIFYING AMBIENT LIGHT FLUCTUATIONS

RELATED APPLICATIONS

This is a U.S. National Phase Application under 35 USC 371 of International Application PCT/EP2013/064828 filed on Jul. 12, 2013.

This application claims the priority of German application no. 10 2012 106 628.0 filed Jul. 20, 2012, the entire content of which is hereby incorporated by reference.

FIELD OF THE INVENTION

The present application relates to a method for identifying ambient light fluctuations and to a semiconductor component for identifying ambient light fluctuations.

BACKGROUND OF THE INVENTION

Ambient light sources supplied by means of a power line often deliver a luminance having periodic fluctuations, the frequency of which is correlated with a line frequency of typically 50 Hz or 60 Hz. Conventional methods for determining the frequency are based on measurements with fast sampling and an evaluation of the measurements by means of fast Fourier transform. However, such methods are computationally very complex and often have low resolution due to the fast sampling. Furthermore, such methods require a high signal strength of the ambient light due to the short integration time.

SUMMARY OF THE INVENTION

It is one object to specify a simple and computationally modest method for identifying ambient light fluctuations and a semiconductor component for identifying ambient light fluctuations.

According to one embodiment, a method for identifying a fluctuation frequency of an ambient light by means of a predetermined first frequency and a predetermined second frequency has the following steps:
  A) specifying the first frequency and the second frequency, the first frequency being lower than the second frequency;
  B) measuring an optical power of the ambient light by means of a signal receiver over a measuring time interval during a total measuring time, the measuring time interval being shorter than or equal to a first cycle duration belonging to the first frequency;
  C) detecting the optical power of the ambient light in a time series over the total measuring time;
  D) determining at least one detection feature for identifying the fluctuation frequency by evaluating the time series; and
  E) identifying the fluctuation frequency of the ambient light as the first frequency or as the second frequency by means of the at least one detection feature.

A fluctuation frequency of an ambient light is understood in the context of the application to be a number of a repetitive variation of a characteristic quantity of the ambient light within one second. The characteristic quantity can be a luminance, an optical power or an optical energy of the ambient light.

The first frequency preferably differs from the second frequency by at least 10%, particularly preferably by at least 15%, for example 20% from the second frequency. In particular, the first frequency differs from the second frequency by 90% at the most. The percentages specified in each case relate to the first frequency. It is also conceivable that the first frequency and the second frequency differ from one another arbitrarily if the second frequency is not a harmonic, that is to say a multiple of the first frequency. The first cycle duration associated with the first frequency is the inverse of the first frequency.

The signal receiver comprises preferably a photodetector. The optical power of the ambient light is preferably measured by means of a photodetector, for example a phototransistor or a photodiode. A signal strength of the electric signal of the photodetector is preferably linearly correlated with the optical power of the ambient light.

In the context of the application, a measuring time interval is understood to be a period during an individual measurement. During the total measuring time, a plurality of measurements is preferably performed. In particular, the measuring time interval is constant during the total measuring time. In other words, the individual measurements exhibit the same measuring time interval, for example. The number of measurements is preferably less than 100, preferably less than 50 and particularly preferably less than 20. In particular, the number of measurements is precisely 3 or 6 or 12.

In the context of the application, a time series is understood to be a temporal sequence of measurement data. In particular, the time series can be represented in a diagram having two coordinate axes, a coordinate axis being a time axis and the further coordinate axis preferably being an axis of the characteristic quantity of the ambient light.

The measurement data preferably comprise measurement values from the measurements, a measurement value preferably being a signal, integrated up over the measuring time interval, of the photodetector, which is correlated preferably linearly with the optical power of the ambient light during the measuring time interval.

A detection feature for identifying the fluctuation frequency is understood, in the context of the application, to be a quantity which can be determined from the time series. By means of the detection feature, the fluctuation frequency of the ambient light is identified especially as the first frequency or as the second frequency. In this context, the detection feature is preferably compared with at least one reference value. The reference value is preferably specified on the basis of the first frequency and/or the second frequency and/or the total measuring time. Alternatively, the reference value can be specified by tests, by simulations or by an analysis of measuring inaccuracy.

The fluctuation frequency of an ambient light source is correlated with the line frequency of the power line with which the ambient light source is applied. To distinguish between the line frequency and the fluctuation frequency, the line frequency is specified electrically in Hertz (Hz) and the fluctuation frequency is specified optically in Hertz in the context of the application. In practice, 1 Hz electrical usually corresponds to 2 Hz optical. In other words, a recalculation of Hertz optical into Hertz electrical converts the fluctuation frequency into the line frequency. This means, for example, that a line frequency of 50 Hz electrical produces a fluctuation frequency of 100 Hz optical. In the context of the application, the fluctuation frequency, the first frequency and the second frequency are specified in Hz optical, only the line frequency being specified in Hz electrical.

According to a further preferred embodiment, the measuring time interval is preferably between inclusively a tenth of a second cycle duration belonging to the second frequency and inclusively the first cycle duration. The second cycle duration is the inverse of the second frequency. Such a measuring time interval allows at least one measurement during the first cycle duration or during the second cycle duration, respectively. Preferably, a plurality of measurements is performed during the second cycle duration.

According to a further preferred embodiment, the first frequency and the second frequency are between inclusively 20 Hz and inclusively 200 Hz. In consequence, the first cycle duration and the second cycle duration are between inclusively 5 milliseconds (ms) and inclusively 50 ms. The measuring time interval is preferably between inclusively 0.5 ms and inclusively 50 ms.

According to a further preferred embodiment, the first frequency is 100 Hz and the second frequency is 120 Hz. This choice of first frequency and second frequency is found to be particularly appropriate for identifying the line frequency of 50 Hz or 60 Hz normally used in practice. The measuring time interval is preferably between inclusively 0.5 ms and inclusively 10 ms. Such a measuring time interval is found to be particularly suitable for identifying the fluctuation frequency as the first frequency or as the second frequency.

According to a further preferred embodiment, the detection feature is preferably a time interval between two successive local minima of the optical power or a time interval between two successive local maxima of the optical power in the time series. Apart from this, the detection feature can also be a time interval between two successive mean-value traverses.

If the optical power does not contain any unambiguous minima or any unambiguous maxima, respectively—i.e. the optical power only fluctuates within the scope of a measuring uncertainty—the ambient light does not exhibit any fluctuation frequency. Otherwise, the fluctuation frequency is identified preferably by comparing the time interval with reference values. The reference values are preferably the first cycle duration and the second cycle duration. If the time interval and the first cycle duration are essentially equal, the fluctuation frequency is identified as the first frequency. If the time interval and the second cycle duration are essentially equal, the fluctuation frequency is identified as the second frequency. "Essentially equal" means, in the context of the application, that the value of the detection feature and the value of the reference value differ by 12% at the most, preferably by 6% at the most, and particularly preferably by 3% at the most from one another. If the time interval is not essentially equal to the first frequency or to the second frequency, the fluctuation frequency is neither the first frequency nor the second frequency.

According to a further preferred embodiment, the total measuring time is preferably at least twice as great as the first cycle duration. This is appropriate since a plurality of time intervals can be determined from the time series. The time interval can then be both a time period between two successive maxima or a time period between two successive minima. The detection feature is preferably a, particularly arithmetic, mean value of the time intervals. Signal deviations due to line fluctuations or changes in the measuring conditions can be taken into consideration by this means. With a line frequency of 50 Hz or 60 Hz, typical line fluctuations are within a range of +/−0.1 Hz. Furthermore, the accuracy of the measurement can be increased by this means which, in turn, means that the measuring time interval can be increased.

The fluctuation frequency is preferably identified by a comparison of the mean value of the time intervals with the first cycle duration and with the second cycle duration. If the mean value and the first cycle duration are essentially equal, the fluctuation frequency is identified as the first frequency. If the mean value, and the second cycle duration are essentially equal, the fluctuation frequency is identified as the second frequency.

According to a preferred design variant, the detection feature is a number of the maxima of the optical power or a number of the minima of the optical power in the time series during the total measuring time. The total measuring time is preferably at least three times greater, preferably at least five times greater and particularly preferably at least ten times greater than the first cycle duration. Furthermore, the total measuring time can be at least twice as great as the smallest common multiple of the first cycle duration and of the second cycle duration. The total measuring time is preferably greater than or equal to 100 ms. The number of minima and the number of maxima during the total measuring time are equal or differ due to a phase shift of the optical power at the starting time of a measuring process by one at the most.

The fluctuation frequency is identified preferably by comparing a numerical value of the detection feature, that is to say the number of maxima or the number of minima, with two reference values. The first reference value is preferably a first quotient, the first quotient being a ratio of the total measuring time to the first cycle duration. The second reference value is preferably a second quotient, the second quotient being a ratio of the total measuring time to the second cycle duration. If an absolute value of a difference between the numerical value of the detection feature and the first quotient is smaller than an absolute value of a difference between the numerical value of the detection feature and the second quotient, the fluctuation frequency is identified as the first frequency. Otherwise, the fluctuation frequency is identified as the second frequency.

According to a preferred design variant, the detection feature is preferably an average of the number of minima and the number of minima. The fluctuation frequency is identified preferably by comparing the average with the first quotient and with the second quotient. If an absolute value of a difference between the average and the first quotient is less than an absolute value of a difference between average and the second quotient, the fluctuation frequency is identified as the first frequency. Otherwise, the fluctuation frequency is identified as the second frequency.

Choosing the average as the detection feature takes into consideration a possible deviation between the number of maxima and the number of minima within the total measuring time as a result of which the accuracy of identification is increased.

According to a further preferred embodiment, preferably at least three first optical period energies of the ambient light are measured. The first optical period energy is an optical power integrated up by way of a first measuring time interval, the first measuring time interval being the first cycle duration. In a representation of the variation with time of the optical power in a diagram having a time axis, the first period energy corresponds to an area below the curve variation of the optical power, during the first cycle duration. Because of the long measuring time interval, the method is relatively insensitive to line frequency fluctuations. As well, disturbances of higher-frequency light sources such as fluorescent lamps are averaged out by this means. It is also conceivable that the first measuring interval is a multiple of the first cycle duration. For example, the first measuring interval is twice or three times the first cycle duration.

According to a preferred design variant, the detection feature is a first relative energy deviation. The first relative energy deviation is a ratio of a first absolute energy deviation to a maximum first period energy.

In the context of the application, the first absolute energy deviation is understood to be a difference between the maximum first period energy and a minimum first period energy, the maximum and the minimum first period energy being the greatest and the lowest period energy, respectively, from the measured first period energies.

If the fluctuation frequency is the first frequency, the first relative energy deviation is zero in the ideal case. In other words, the at least three measured first period energies are equal in the ideal case.

For the purpose of taking into consideration measuring inaccuracies, it has been found to be appropriate to compare the first relative energy deviation with a reference value of the energy deviation for identifying the fluctuation frequency. The reference value of the energy deviation is preferably less than 0.12, preferably less than 0.06 and particularly preferably less than 0.03. If the first relative energy deviation is less than the reference value of the energy deviation, the fluctuation frequency is identified as the first frequency. Otherwise, the fluctuation frequency is identified as the second frequency.

Preferably, precisely three measurements are performed in order to identify the fluctuation frequency as the first frequency or as the second frequency.

According to a further preferred embodiment, at least three second optical period energies of the ambient light are preferably measured. The second optical period energy is the optical power integrated up over a second measuring time interval, the second measuring time interval being the second cycle duration. It is also conceivable that the second measuring interval is a multiple of the second cycle duration. For example, the first measuring interval is twice or three times the first cycle duration.

According to a preferred variant of the embodiment, the detection feature is a second relative energy deviation. The second relative energy deviation is a ratio of a second absolute energy deviation to a maximum second period energy.

The second absolute energy deviation results from a difference between the maximum second period energy and a minimum second period energy, the maximum and the minimum second period energy being the largest and the smallest period energy, respectively, from the measured second period energies.

If the fluctuation frequency is the second frequency, the second relative energy deviation is zero in the ideal case. In other words, the at least three first period energies measured are equal in the ideal case.

The fluctuation frequency is identified by a comparison of the second relative energy deviation with the reference value of the energy deviation. If the second relative energy deviation is smaller than the reference value of the energy deviation, the fluctuation frequency is identified as the second frequency. Otherwise, the fluctuation frequency is identified as the first frequency.

It is also conceivable that both the first relative energy deviation and the second relative energy deviation are greater than the reference value of the energy deviation. In this case, the fluctuation frequency is neither the first frequency nor the second frequency.

According to a further preferred embodiment, the first optical period energy and the second optical period energy are measured in each case at least three times, particularly preferably in each case precisely three times.

According to a preferred variant of the embodiment, the detection feature is a deviation quotient. The deviation quotient is a ratio of the first absolute energy deviation to the second absolute energy deviation.

The fluctuation frequency is identified preferably by comparing the deviation quotient with a reference value of the deviation quotient. The reference value of the deviation quotient is preferably between inclusively 0.5 and inclusively 2. Particularly preferably, the reference value of the deviation quotient is between inclusively 0.9 and inclusively 1.5, for example 1.2. It is found to be particularly appropriate to choose 1 as the reference value of the deviation quotient.

If the fluctuation frequency is the first frequency, the first cycle duration is identical with the inverse of the fluctuation frequency. In consequence, the first cycle duration is equal to one full period of the periodic ambient light fluctuation. Accordingly, all first measured period energies are equal independently of a phase shift, apart from measuring inaccuracies. The second period energy is the optical power of the ambient light, integrated up over the second cycle duration, the second cycle duration being different from the first cycle duration. Accordingly, the second period energies measured, in particular measured immediately after one another, differ from one another significantly since the measured second period energy is not independent of the phase shift. In the ideal case of a measurement without measuring inaccuracies, the first absolute energy deviation would be zero. Under real measuring conditions, it can be expected at least that the first absolute energy deviation is less than the second absolute energy deviation so that the deviation quotient of the first absolute energy deviation to the second absolute energy deviation is less than 1. If, in contrast, the fluctuation frequency is the second frequency, a deviation quotient of greater than 1 can be expected. If the deviation quotient is equal to 1 it may mean that the ambient light is not subject to any or only to small fluctuations. For example, the ambient light can be connected to a direct-voltage source or originate from a natural light source like the sun.

For the identification of the fluctuation frequency, the following criterion is preferably used: if the deviation quotient is less than the reference value of the deviation quotient, the fluctuation frequency is identified as the first frequency. If the deviation quotient is greater than the reference value of the deviation quotient, the fluctuation frequency is identified as the second frequency.

Preferably, precisely six measurements are performed in order to identify the fluctuation frequency as the first frequency or as the second frequency. It is also conceivable that the number of measurements is more than 6, for example 8, 12 or 18.

According to a further preferred embodiment, the first optical period energy and the second optical period energy are measured in each case at least six times. From the measured period energies, a first standard deviation of the first period energies and a second standard deviation can be calculated. The first/second standard deviation is then a measure of the dispersion of the first/second period energies around a mean value of the first/second measured period energies.

According to a preferred variant of the embodiment, the detection feature is a standard deviation. If the first standard deviation is smaller than the second standard deviation, the fluctuation frequency is identified as the first frequency. Otherwise, the fluctuation frequency is identified as the second frequency.

Random measurement inaccuracies are taken into consideration by means of the standard deviation which increases the accuracy of the result from the identification.

According to one embodiment, a semiconductor component comprises at least one signal receiver for measuring an optical power of the ambient light. The signal receiver preferably contains a photodetector. The photodetector converts the received ambient light preferably into an electrical signal.

Furthermore, the semiconductor component comprises preferably a control module. During the operation of the semiconductor component, the control module is used for controlling the semiconductor component. For example, a measuring process of the optical power of the ambient light is controlled by means of the control module. The control module is provided preferably for detecting and analyzing the measured optical power or optical energy, respectively, of the ambient light over the total measuring time and for determining at least one detection feature and for identifying the fluctuation frequency as the first frequency or as the second frequency.

The control module is preferably provided for performing the method described above.

The semiconductor component also comprises a signal output. The signal output is used particularly for conveying a result from the identification of the fluctuation frequency. During the operation of the semiconductor component, a signal is preferably present at the signal output. This signal contains preferably the result of the identification of the fluctuation frequency of the ambient light in a coded form, particularly in a digital form or in an analog form, for example in the form of a direct-voltage value.

In addition, a display device comprising a semiconductor component is specified. According to a preferred embodiment, the semiconductor component is integrated in the display device. The display device can be, for example, a display in a motor vehicle.

In addition, a mobile electronic device comprising a semiconductor component is specified. According to a preferred embodiment, the semiconductor component is integrated into the mobile electronic device. The mobile electronic device is preferably a mobile telephone or a computer or a tablet.

BRIEF DESCRIPTION OF THE DRAWINGS

Further advantages, preferred embodiments and developments of the method and of the semiconductor component are obtained from the exemplary embodiments explained in conjunction with the following figures in which:

FIGS. 4A, 4B, 5A, 5B and 5C show in each case a further exemplary embodiment of a method for identifying a fluctuation frequency, FIG. 6 shows a representation in table form of deviation quotients from a simulation for various types of lamp at a line frequency of 50 Hz or 60 Hz, respectively.

The figures are in each case diagrammatic representations and therefore are not necessarily true to scale.

DETAILED DESCRIPTION OF THE DRAWINGS

Figure 1:
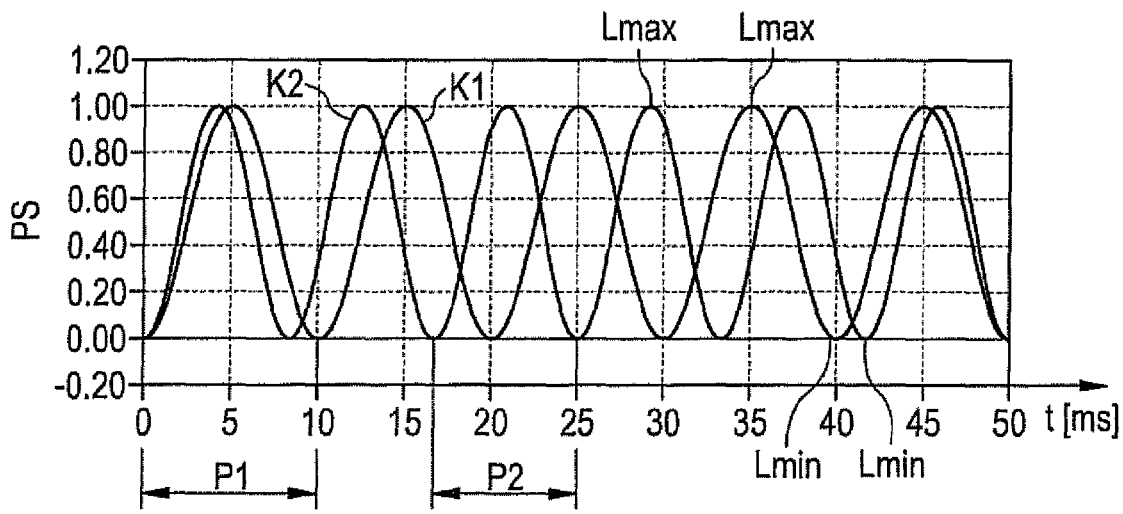
FIG. 1 shows a variation with time of a standardized optical power of an ambient light having a fluctuation frequency of 100 Hz or 120 Hz, respectively.

FIG. 1 shows a variation of a standardized optical power (PS) of an ambient light in dependence on time (t) in milliseconds (ms). A curve K1 describes an ideal periodic variation with time of the standardized optical power of an ambient light having a fluctuation frequency (F) which corresponds to a first frequency (F1) of 100 Hz. A first cycle duration (P1) belonging to the first frequency is thus 10 ms. A curve K2 describes correspondingly an ideal periodic variation with time of the standardized optical power of a further ambient light having a fluctuation frequency (F) of 120 Hz and an associated second cycle duration (P2) of 8.33 ms. The curves K1 and K2 have local maxima (Lmax) and local minima (Lmin).

The exemplary embodiments described in the text which follows in this application relate by way of example to the first frequency of 100 Hz and the second frequency of 120 Hz. Naturally, the first frequency and the second frequency can be different from 100 Hz or 120 Hz, respectively.

Figure 2A:
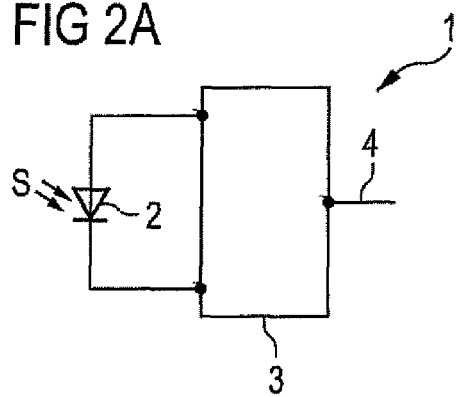
FIG. 2A shows a diagrammatic configuration of a semiconductor component for identifying a fluctuation frequency.

FIG. 2A shows a diagrammatic structure of a semiconductor component (1) for identifying a fluctuation frequency (F) of an ambient light (S).

The semiconductor component comprises a signal receiver (2). The signal receiver (2) is provided preferably for measuring an optical power (PS) of the ambient light (S). The signal receiver can contain, for example, a photodiode or a phototransistor. Furthermore, the semiconductor component comprises a control module (3). When the semiconductor component is in operation, the control module (3) is used for controlling the semiconductor component (1). The semiconductor component also comprises a signal output (4). When the semiconductor component is in operation, there is preferably a signal present at the signal output (4). The signal can contain, in particular, the information whether a fluctuation frequency of the ambient light is present, or it can contain a result from the identification of the fluctuation frequency (F) of the ambient light (S) in a coded form, for example in digital or in analogue form. Furthermore, the signal output (4) contains preferably an additional output at which information relating to the brightness of the ambient light is present in a coded form.

Figure 2B:
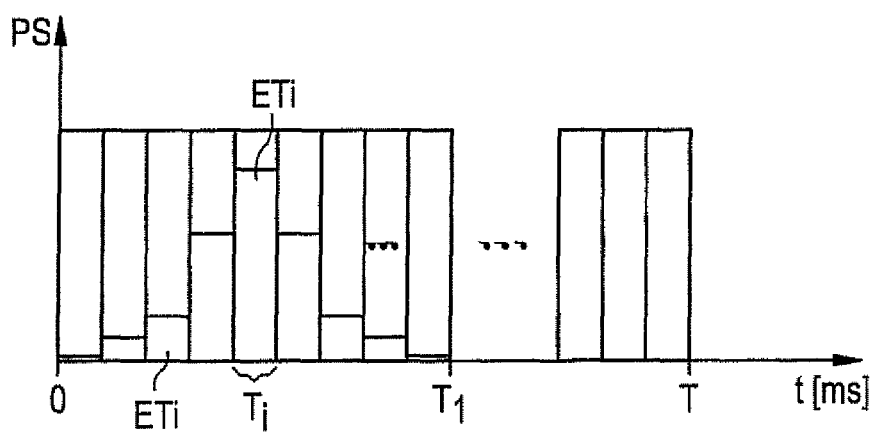
FIG. 2B shows a basic principle for determining an optical energy of an ambient light.

FIG. 2B illustrates a principle for a measuring process of an optical power of an ambient light during a total measuring time (T) by means of a diagrammatic representation of an optical power (PS) of the ambient light as a function of time (t).

A measurement is performed over a measuring time interval (Ti). The measuring time interval (Ti) is shorter than a first cycle duration (T1). During a measurement, an optical power (PS) is registered and integrated up over the measuring time interval. An optical power (ETi) integrated up over the measuring time interval is an optical energy during the measuring time interval. The amount of this energy (ETi) corresponds to an area of a rectangle shown in FIG. 2B, one horizontal side of this rectangle being the measuring time interval. A first period energy (E1) is the sum of all optical powers (ETi) integrated up during the first cycle duration (T1).

The integrated up optical powers (ETi) resulting over the total measuring time result in a time series which can be represented in the form of the diagram shown in FIG. 1.

In FIG. 2B, the measurements are performed directly following one another. Apart from this, the measurements can be performed in a measuring time interval, the measuring time interval being a time period between two successive measurements. The measuring time interval (Ti) can also be selected to be variable. In particular, the measuring time interval can be identical with the first cycle duration (T1).

Figure 3A:
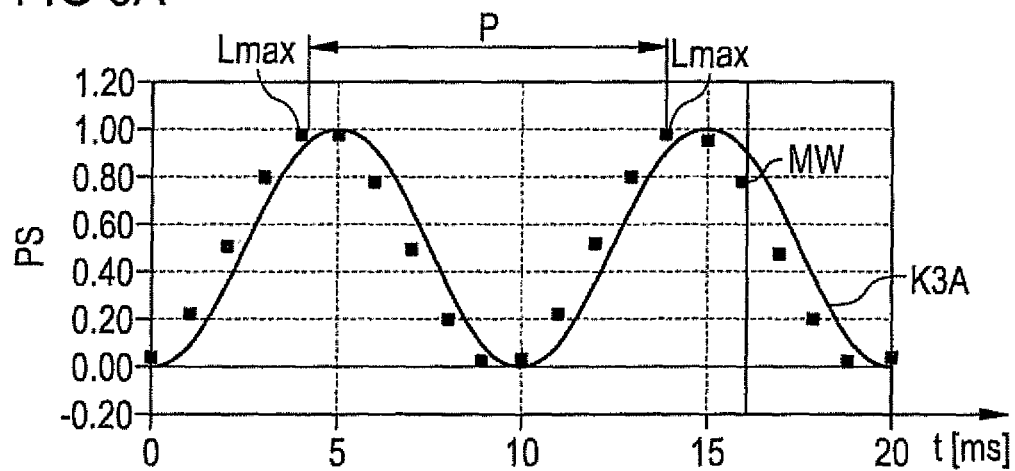
FIGS. 3A and 3B show a first exemplary embodiment of a method for identifying a fluctuation frequency.

A first exemplary embodiment of a method for identifying a fluctuation frequency (F) of an ambient light (S) by means of a predetermined first frequency (F1) and a predetermined second frequency (F2) is shown diagrammatically in FIG. 3A.

In step A), the first frequency F1=100 Hz and the second frequency F2=120 Hz are specified which corresponds to a line frequency of 50 Hz or 60 Hz, respectively. Accordingly, the first cycle duration (P1) is 10 ms and the second cycle duration (P2) is 8.33 ms.

In step B), measuring is carried out over a total measuring time (T) of 20 ms. The measuring time interval (Ti) is one tenth of the first cycle duration (P1), that is to say Ti=1 ms. During the total measuring time, measurements are performed and the optical power of the ambient light or, respectively, the optical powers (ETi) integrated up over the measuring time interval (Ti) are determined. The number of measurements is preferably less than 20. FIG. 2B shows measurement values (MW) from a simulation for the integrated up optical powers (ETi). A continuous curve K3A represents in comparison with the measurement values (MW) an ideal periodic variation with time of the standardized optical power of an ambient light having a fluctuation frequency of F=100 Hz.

In step C), the integrated up optical powers or the optical power (PS), respectively, are detected in a time series over the total measuring time (T). FIG. 3A shows the time series in the form of a diagram with a standardized optical power of the ambient light over time (t) in milliseconds (ms).

In step D), a detection feature is determined in the time series. The detection feature is a time interval (P) between two successive maxima (Lmax) of the measured optical power in the time series.

Identifying the fluctuation frequency (F) of the ambient light in step E) occurs by means of a comparison of the time interval (P) with the first cycle duration (P1) and the second cycle duration (P2). The time interval (P) determined in FIG. 3A is approx. 10 ms and is thus essentially equal to the first cycle duration (P1). In consequence, the fluctuation frequency of the ambient light is identified as the first frequency F1=100 Hz.

Figure 3B:
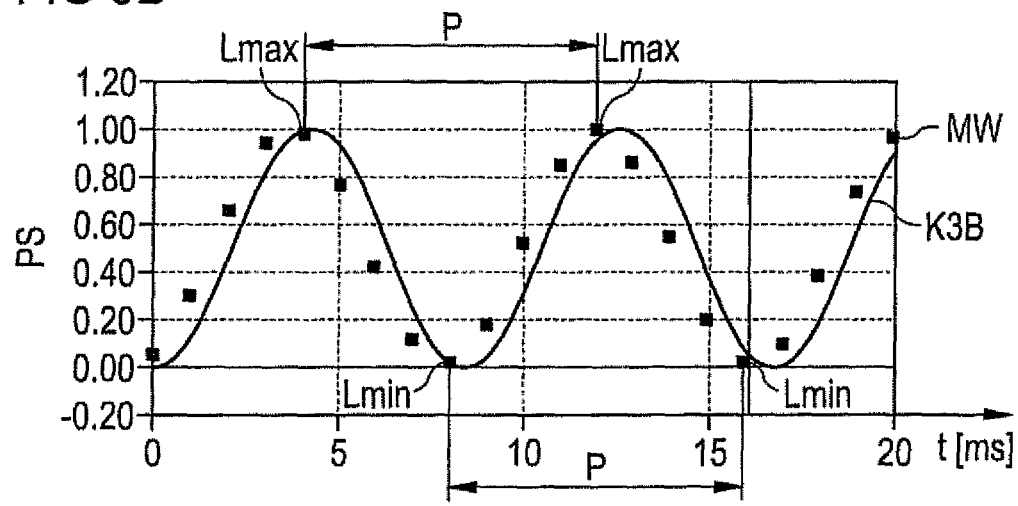

The exemplary embodiment shown in FIG. 3B is essentially the exemplary embodiment shown in FIG. 3A. In distinction therefrom, it is shown that the determined time interval and the determined mean value of the time intervals are in each case approx. 8.3 ms so that the fluctuation frequency (F) is identified as the second frequency F2=120 Hz. For the comparison with the measurement values (MW) of the optical power, a continuous curve K3B represents an ideal periodic variation with time of the standardized optical power of an ambient light having a fluctuation frequency F=120 Hz.

Alternatively, the detection feature can be a time interval (P) between two successive local minima (Lmin) of the measured optical power or a mean value (PM) of the time intervals (P). In FIG. 3B, the time interval (P) can be determined twice in the time series. The mean value (PM) of the time intervals (P) can be formed. The time interval and the mean value (PM) are in each case approx. 10 ms so that in step E), the fluctuation frequency (F) of the ambient light is identified as the first frequency F1=100 Hz.

Figure 4A:
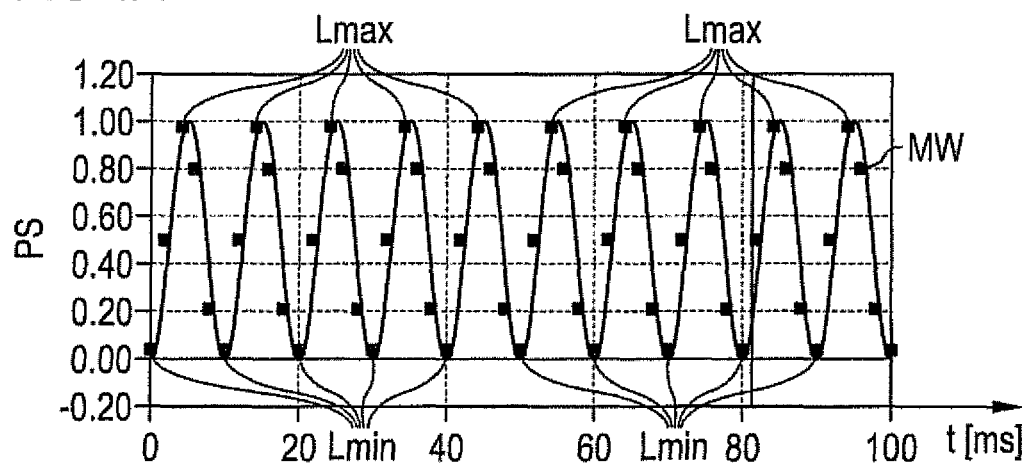

A further exemplary embodiment of a method for identifying a fluctuation frequency (F) is shown diagrammatically in FIG. 4A. Steps A) to C) essentially correspond to steps A) to C) of the first exemplary embodiment shown in FIG. 3A. In distinction therefrom, the total measuring time (T) and the measuring time interval (Ti) are 100 ms or 2 ms, respectively. Preferably, the number of measurements is less than 50.

In step D), the detection feature is determined as a number of the maxima (Nmax) of the optical power during the total measuring time (T) in the time series.

Nmax is the total number of local maxima in the time series and is 10. Nmax is compared with two reference values in step E). The first reference value is a first quotient (Q1) which is a ratio of the total measuring time T=100 ms to the first cycle duration T1=10 ms and, in consequence, is 10. The second reference value is a second quotient (Q2) which is a ratio of the total measuring time T=100 ms to the second cycle duration T2=8.33 ms and, in consequence, is 12. The absolute value of a difference between Nmax and Q1 is in this case zero and is lower than the absolute value of a difference between Nmax and Q2 which is 2 so that the fluctuation frequency (F) is identified as the first frequency F1=100 Hz.

Alternatively, the detection feature is determined in step D) as a number of the minima (Nmin) of the optical power during the total measuring time (T) in the time series. The number of minima (Nmin) in the time series is 9. The integrated up powers (ETi) from the first measurement and from the last measurement should in each case not be considered to be a local minimum since there are no measurements before or after, respectively, so that it is not possible to determine whether these integrated up powers are local minima. The absolute value of a difference between Nmin and Q1 is in this case 1 and is less than the absolute value of a difference between Nmin and Q2 which is 3 so that the fluctuation frequency (F) is identified as the first frequency F1 100 Hz.

Alternatively, the detection feature can be determined in step D) as an average (NM) of Nmin and Nmax. The average is 9.5. The absolute value of a difference between the average (NM) and Q1 is in this case 0.5 and is lower than the absolute value of a difference between the average and Q2 which is 2.5 so that the fluctuation frequency (F) can be identified as the first frequency F1=100 Hz.

Apart from this, it is also conceivable that in step D), the detection feature is determined as a number of the mean value traverses.

Figure 4B:
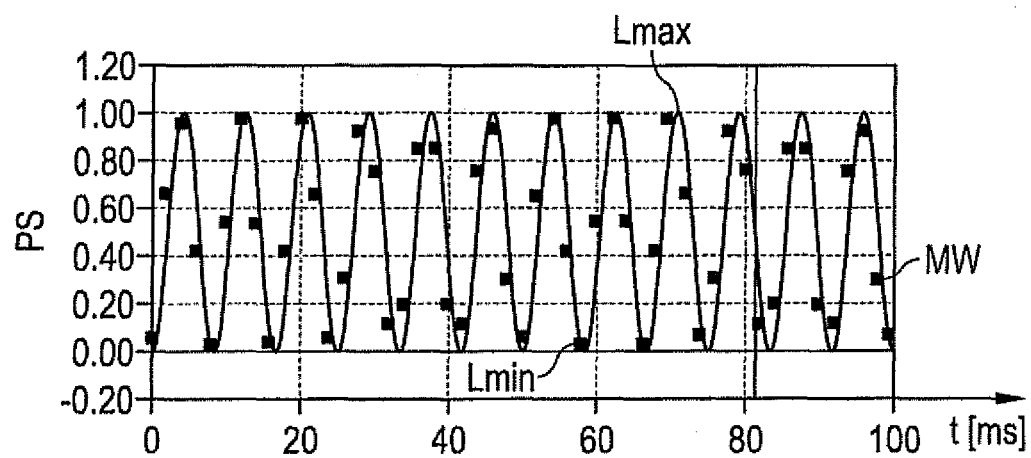

The exemplary embodiment shown in FIG. 4B is essentially the exemplary embodiment shown in FIG. 4A. In distinction therefrom, it is found that the number of maxima is 12, the number of minima is 11 and the average of Nmax and Nmin is 11.5 so that the fluctuation frequency (F) is identified as the second frequency F2=120 Hz.

A further exemplary embodiment of a method for identifying a fluctuation frequency (F) is shown diagrammatically in FIG. 5A. Steps A) to C) essentially correspond to steps A) to C) of the first exemplary embodiment shown in FIG. 3A. In distinction therefrom, the measuring time interval (Ti) is a first measuring time interval (T1), wherein T1 is identical to the first cycle duration P1=10 ms. In addition, only three measurements are performed over the first measuring time interval for determining three first optical period energies (E1). In FIG. 5A, the three first optical period energies (E1) are represented by the respective areas below the straight sections R1-R2, R2-R3 and R3-R4. These areas are identical with the respective areas below the curve sections R1-R2, R2-R3 and R3-R4.

In step D), the detection feature is determined as a first relative energy deviation (EA1) from the time series. The first relative energy deviation is a ratio of a first absolute energy deviation to a maximum first optical period energy (E1max) from the three period energies (E1). The first absolute energy deviation is then a difference between the maximum first period energy (E1max) and a minimum first optical period energy (E1min) from the three period energies (E1). Expressed in a formula, EA1=(E1max−E1min)/E1max.

The fluctuation frequency (F) is identified by a comparison of the first relative energy deviation (EAU) with a reference value of the energy deviation. The reference value of the energy deviation is, for example, 0.12. It is also conceivable that the reference value of the energy deviation is 0.06 or 0.03. If the first relative energy deviation (EA1) is smaller than the reference value of the energy deviation, the fluctuation frequency is identified as the first frequency F1=100 Hz. Otherwise, the fluctuation frequency is identified as the second frequency F2=120 Hz. In FIG. 5A, the three first period energies (E1) are equal apart from small measurement deviations. In consequence, the fluctuation frequency (F) is identified as the first frequency F1=100 Hz.

An exemplary embodiment shown in FIG. 5B, is essentially the exemplary embodiment shown in FIG. 5A. In distinction therefrom, it is found that the three first period energies (E1) differ distinctly from one another. In this case, the three first period energies (E1) are represented by the respective areas below the straight sections R1-R1', R2-R2' and R3-R3'. The first maximum energy deviation (E1max) differs significantly from the first minimum energy deviation (E1min) so that the fluctuation frequency (F) is identified as the second frequency F2=120 Hz.

Figures 5C, 6:
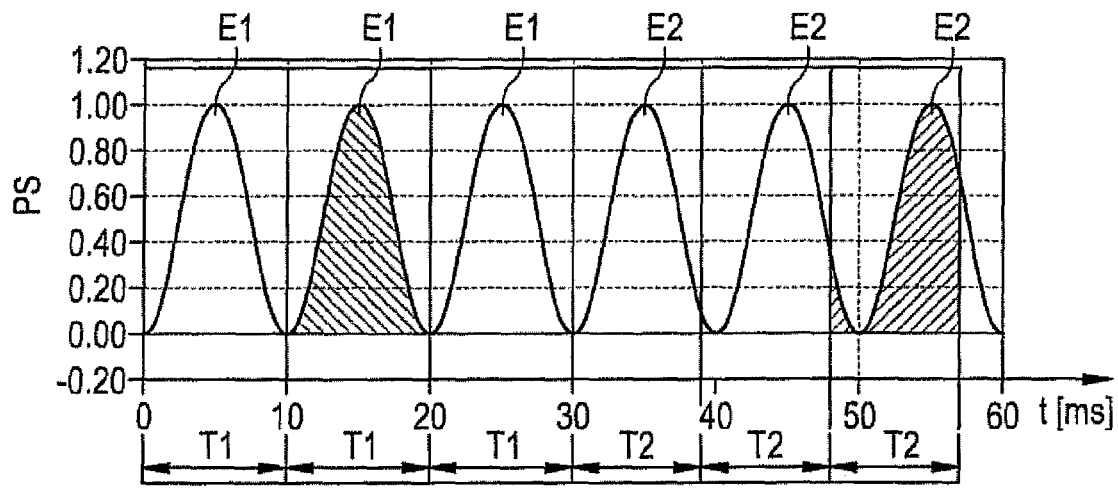

A further exemplary embodiment of a method for identifying a fluctuation frequency (F) of an ambient light is shown diagrammatically in FIG. 5C.

Analogously to the exemplary embodiment shown in FIG. 5A, the three first period energies (E1) and a first absolute energy deviation are determined, the first absolute energy deviation being a difference between the maximum first period energy (E1max) and the minimum first period energy (E1min), that is to say E1max−E1min.

Additionally, three second period energies (E2) are measured and a second absolute energy deviation is determined. The total number of measurements is thus six. The second period energy (E2) is measured over a second measuring time interval (T2), T2 being identical with the second cycle duration P2=8.33 ms. The second absolute energy deviation is a difference between the maximum second period energy (E2max) and the minimum second period energy (E2min), that is to say E2max−E2min.

Furthermore, the detection feature is determined as a deviation quotient in step D). The deviation quotient is a ratio of the first absolute energy deviation to the second absolute energy deviation, that is to say (E1max−E1min)/(E2max−E2min).

In step E), the fluctuation frequency (F) of the ambient light is identified preferably by a comparison of the deviation quotient with a reference value of the deviation quotient. The reference value of the deviation quotient is then preferably between inclusively 0.9 and inclusively 1.5, for example 1.2.

If the deviation quotient is less than the reference value of the deviation quotient, the fluctuation frequency (F) is identified as the first frequency F=100 Hz. If the deviation quotient is greater than the reference value of the deviation quotient, the fluctuation frequency (F) is identified as the second frequency F=120. In the present case, the fluctuation frequency (F) is identified as the first frequency F=100 Hz.

FIG. 6 shows in the form of a table the deviation quotients from a simulation for different lamp types at a line frequency of 50 Hz or 60 Hz, respectively. The first six lamps are energy-saving lamps and the last lamp is a fluorescent lamp.

These values prove that the deviation quotient for the various lamp types is in each case significantly less than 1 at a line frequency of 50 Hz and is significantly greater than 1 at a line frequency of 60 Hz. Thus, the fluctuation frequency of 100 Hz optical can be identified in correspondence with a line frequency of 50 Hz or the fluctuation frequency of 120 Hz can be identified in correspondence with a line frequency of 60 Hz in a reliable manner.

The present application describes a method for identifying the fluctuation frequency of an ambient light by means of a predetermined first frequency and a predetermined second frequency. In this context, it is possible to detect whether an ambient light has a fluctuation frequency, the fluctuation frequency corresponding to a predetermined first frequency or a predetermined second frequency or that the fluctuation frequency is different from the first frequency and from the second frequency. The measurements according to the various variants of embodiments can, therefore, be attuned selectively to the first frequency and second frequency presumably to be expected. This simplifies the measuring and evaluation in comparison with conventional methods which, for example, determine fluctuation frequencies by means of a Fourier transformation of the signal. In particular, comparatively large measuring time intervals can be applied as a result. The number of needed measurements for identifying a fluctuation frequency can also be reduced comparatively significantly. In addition, the evaluation is designed to be simple and not computationally complex. In particular, this leads to a semiconductor component for identifying fluctuation frequency being able to be produced cost effectively and with little expenditure in accordance with such methods.

By describing the invention by means of the exemplary embodiments, the invention is not restricted to these. Instead, the invention comprises each novel feature and each combination of features which, in particular, includes each combination of features in the patent claims even if this feature or this combination itself is not specified explicitly in the patent claims or exemplary embodiments.

The invention claimed is:

1. A method for identifying a fluctuation frequency of an ambient light by means of a predetermined first frequency and a predetermined second frequency using a semiconductor component comprising (a) a photodetector to measure an optical power of the ambient light and to generate an electrical signal corresponding to the measured optical power, and (b) a signal processor electrically connected to the photodetector to analyze the electrical signal generated by the photodetector corresponding to the measured optical power over a total measuring time, to determine at least one detection feature in the electrical signal for identifying the fluctuation frequency of the ambient light as the first frequency or as the second frequency, to use the at least one detection feature to identify the fluctuation frequency of the ambient light as the first frequency or as the second frequency, and to output, in an output electrical signal, the identification of the fluctuation frequency, the method comprising the following steps:

A) specifying the first frequency and the second frequency, the first frequency being lower than the second frequency;
B) measuring an optical power of the ambient light using the photodetector over a measuring time interval during the total measuring time, the measuring time interval being equal to a first cycle duration belonging to the first frequency;
C) detecting the optical power of the ambient light in a time series over the total measuring time using the photodetector;
D) determining, using the signal processor, at least one detection feature for identifying the fluctuation frequency by evaluating the time series, wherein the detection feature is determined from a plurality of period energies which are in each case an optical power integrated up over the measuring time interval;
E) identifying, using the signal processor, the fluctuation frequency of the ambient light as the first frequency or as the second frequency by means of the at least one detection feature; and
F) outputting by the signal processor, in the output electrical signal, the identification of the fluctuation frequency.

2. The method according to claim 1, wherein the first frequency differs from the second frequency by at least 10%.

3. The method according to claim 1, wherein the first frequency and the second frequency are between inclusively 20 Hz and inclusively 200 Hz, and the measuring time interval is between inclusively 50 ms and inclusively 0.5 ms.

4. The method according to claim 1, wherein the first frequency is 100 Hz and the second frequency is 120 Hz.

5. The method according to claim 1, wherein the measuring time interval is a cycle duration or a multiple of the cycle duration of the first or of the second frequency and the detection feature is determined from a plurality of period energies, wherein the period energies are in each case an optical power integrated up over the measuring time interval.

6. The method according to claim 1, wherein:
in step D), the detection feature is a time interval between two successive minima of the optical power of the ambient light or a time interval between two successive maxima of the optical power of the ambient light in the time series; and
in step E), the fluctuation frequency of the ambient light is identified by a comparison of the time interval with the first cycle duration and a second cycle duration belonging to the second frequency.

7. The method according to claim 6, wherein:
in step B), the total measuring time is at least twice as great as the first cycle duration;
in step D), a plurality of time intervals is determined in the time series; and
in step E) the fluctuation frequency of the ambient light is identified by a comparison of a mean value of the time intervals with the first cycle duration and the second cycle duration.

8. The method according to claim 1, wherein:
in step D), the detection feature is a number of the maxima of the optical power or a number of the minima of the optical power in the time series during the total measuring time; and in step E), the fluctuation frequency of the ambient light is identified by a comparison of the number of maxima or the number of minima with a first quotient and a second quotient, wherein the first quotient is a ratio of the total measuring time to the first cycle duration and the second quotient is a ratio of the total measuring time to a second cycle duration belonging to the second frequency.

9. The method according to claim 8, wherein, in step E), the fluctuation frequency of the ambient light is identified by a comparison of an average of the number of maxima and the number of minima with the first quotient and with the second quotient.

10. The method according to claim 1, wherein in step B), at least one of:
(a) at least three first optical period energies of the ambient light are measured, wherein measuring of the individual first optical period energy is performed in each case over a first measuring time interval which is the first cycle duration; and
(b) at least three second optical period energies of the ambient light are measured, wherein measuring the individual second optical period energy is carried out in each case over a second measuring time interval which is a second cycle duration belonging to the second frequency.

11. The method according to claim 10, wherein:
in step D), a first absolute energy deviation and a second absolute energy deviation are calculated, wherein the first absolute energy deviation is a difference between a maximum first period energy and a minimum first period energy, and the second absolute energy deviation is a difference between a maximum second period energy and a minimum second period energy; and
in step D), the detection feature is a deviation quotient, wherein the deviation quotient is a ratio of the first absolute energy deviation to the second absolute energy deviation.

12. The method according to claim 11, wherein:
the first frequency is 100 Hz and the second frequency is 120 Hz; and
in step E), for identifying the fluctuation frequency as the first frequency or as the second frequency, the deviation quotient is compared with a reference value of the deviation quotient, wherein the reference value of the deviation quotient is between inclusively 0.5 and inclusively 2.0.

13. A semiconductor component for identifying a fluctuation frequency of an ambient light as a predetermined first frequency or as a predetermined second frequency, wherein the semiconductor component comprises:
a photodetector which measures an optical power of the ambient light and generates an electrical signal corresponding to the measured optical power;
a signal processor electrically connected to the photodetector which analyzes the electrical signal generated by the photodetector corresponding to the measured optical power over a total measuring time, determines at least one detection feature in the electrical signal for identifying the fluctuation frequency of the ambient light as the first frequency or as the second frequency, uses the at least one detection feature to identify the fluctuation frequency of the ambient light as the first frequency or as the second frequency and identifies, in an output electrical signal, the fluctuation frequency.

14. A display device or mobile electronic device comprising a semiconductor component according to claim 13.

* * * * *